(No Model.)
C. A. LUDEWIG.
HORSE COLLAR.
No. 436,875. Patented Sept. 23, 1890.
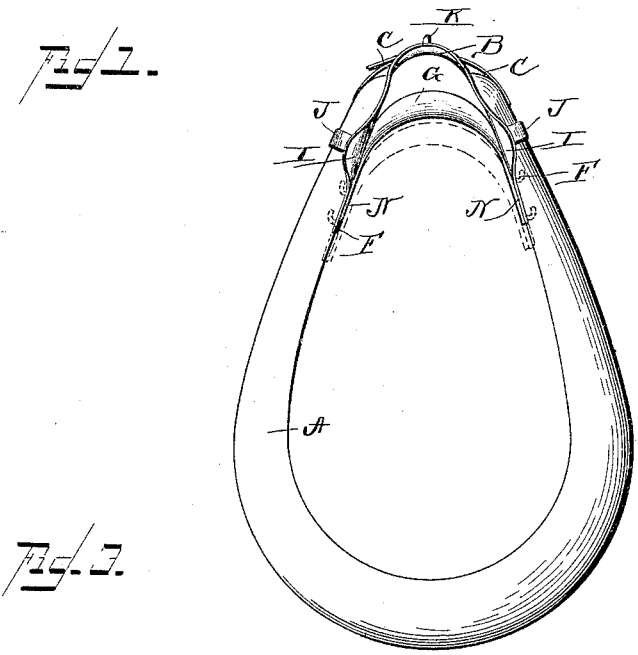
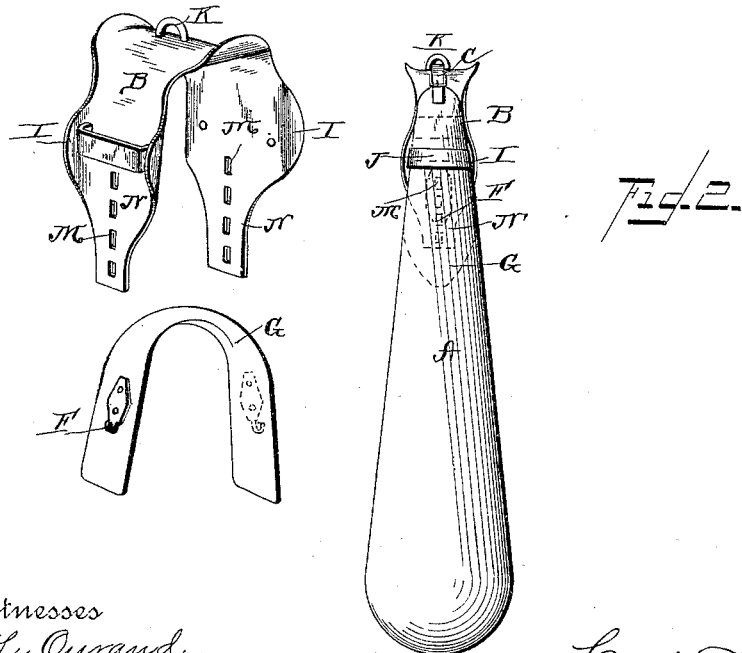
Witnesses
F. L. Durand
F. O. Davis
Inventor:
Carl A. Ludewig
By his Attorneys

UNITED STATES PATENT OFFICE.

CARL ADOLPH LUDEWIG, OF PITTSVILLE, WISCONSIN.

HORSE-COLLAR.

SPECIFICATION forming part of Letters Patent No. 436,875, dated September 23, 1890.

Application filed August 26, 1889. Serial No. 322,002. (No model.)

*To all whom it may concern:*

Be it known that I, CARL ADOLPH LUDEWIG, a citizen of the United States, residing at Pittsville, in the county of Wood and State of Wisconsin, have invented certain new and useful Improvements in Horse-Collars; and I do hereby declare the following to be a full, clear, and exact description of the invention, such as will enable others skilled in the art to which it appertains to make and use the same.

My invention relates to an adjusting device for horse-collars, and my object is to produce a simple, cheap, and durable device that can be applied to almost any ordinary horse-collar, whereby the collar may be given an adjustment to fit horses of various sizes.

With these ends in view my invention consists in the peculiar features and combinations of parts more fully described hereinafter, and pointed out in the claims.

In the accompanying drawings, Figure 1 represents a side elevation, and Fig. 2 an end view, both views showing the spreader in raised adjustment, the dotted lines showing the position of the spreader when lowered two or three notches to reduce the size of the collar; and Fig. 3, detail views.

The reference-letter A represents a horse-collar provided with my attachment, which consists in the metallic arch or spreader B. The spreader is composed of zinc or other material having sufficient stiffness to prevent it from becoming bent when the ends of the collar are drawn up tightly by the straps C. The downwardly-extending sides N of the spreader extend outwardly and pass astride a soft leather pad G, which forms a support for it. The spreader is given a size and shape which will permit it to readily pass under the upper ends of the collar, so that the pad will rest upon the horse's neck.

The hooks F or other suitable supports for the pad are riveted or otherwise secured to the same upon its opposite sides. These hooks are arranged to pass through a vertical series of perforations or recesses M in the sides of the spreader, by means of which the pad can be adjusted to various heights to increase or reduce the size of the collar.

Upon the opposite edges of the spreader are formed ears I, which are bent up out of the metal for the purpose of confining the ends of the collar upon the spreader. The ends of the collar pass up through the loops J, which are secured to the opposite sides of the spreader between the ears I.

The collar-straps C pass through a staple K, by means of which the spreader is securely held in place.

When it is desired to enlarge the collar for a thicker-set or larger horse, the pad can easily be raised to the positions shown in full lines by slightly spreading the sides N apart to clear the shoulders M upon the hooks F, and lifting the pad so that the hooks will enter and engage the sides of a higher pair of perforations, and when it becomes necessary to reduce the size of the collar the pad can in the same way be dropped down to engage lower perforations. It will be seen that the collar-straps are raised clear of the horse's neck by means of this adjustable spreader and the entire weight of the collar is brought to bear upon the soft-leather pad G. The supporting and adjusting hooks F permit the spreader to swing or oscillate slightly during the movement of the horse, thereby preventing the pad from working back and forth on the horse's neck, thus overcoming the usual friction and galling.

It is evident that many slight changes which might suggest themselves to a skilled mechanic could be resorted to without departing from the spirit and scope of my invention; hence I do not limit myself to the precise construction herein shown.

Having thus described my invention, what I claim as new, and desire to secure by Letters Patent, is—

1. The combination, with a horse-collar, of a metallic spreader provided with a series of recesses, devices, substantially as described, arranged to enter said recesses and engage the spreader, and a pad to which said fastening devices are secured to render said pad vertically adjustable in relation to said spreader, in the manner and for the purpose set forth.

2. The combination of a metallic spreader having a series of recesses in its lower ends, a pad arranged beneath said spreader, metallic connections, substantially as described, secured to said pad and arranged to engage said recesses to adjustably and pivotally secure said spreader and pad together, a collar whose upper ends are arranged to fit over the lower ends of said spreader, and confining-loops secured to said spreader and inclosing said collar ends, in the manner and for the purpose set forth.

3. The combination of a spreader having a series of recesses in its lower ends, a pad arranged beneath said spreader, hooks secured to said pad and arranged to engage said recesses to adjustably and pivotally connect said pad and spreader, loops secured to said spreader, collar ends arranged to engage said loops, and a staple in the top of said spreader through which the collar-strap passes, all arranged substantially as and for the purpose described.

In testimony whereof I affix my signature in presence of two witnesses.

CARL ADOLPH LUDEWIG.

Witnesses:
JOHN J. DODD,
W. FARRELL.